United States Patent [19]
Stoneham et al.

[11] Patent Number: 5,030,978
[45] Date of Patent: Jul. 9, 1991

[54] PHOTOGRAPHIC FILM CASSETTE

[75] Inventors: Jeffrey R. Stoneham, Hilton; J. David Cocca, Rochester, both of N.Y.

[73] Assignee: Eastman Kodak Company, Rochester, N.Y.

[21] Appl. No.: 581,333

[22] Filed: Sep. 12, 1990

[51] Int. Cl.$^5$ ............................................. G03B 7/24
[52] U.S. Cl. ........................................ 354/21; 354/275
[58] Field of Search ............... 354/21, 214, 217, 218, 354/275, 289.1; 242/71.1

[56] References Cited

U.S. PATENT DOCUMENTS

| | | | |
|---|---|---|---|
| 4,349,272 | 9/1982 | Holthusen | 355/21 X |
| 4,500,183 | 2/1985 | Tanikawa | 354/21 |
| 4,579,432 | 4/1986 | Kobayashi | 354/21 |
| 4,693,574 | 9/1987 | Ohnuki et al. | 354/21 X |
| 4,947,197 | 8/1990 | Smart et al. | 354/289.1 X |
| 4,965,600 | 11/1990 | Smart et al. | 354/289.1 |
| 4,978,985 | 12/1990 | Smart et al. | 354/275 |

FOREIGN PATENT DOCUMENTS

| 29617 | 8/1976 | Japan. |
|---|---|---|
| 163624 | 12/1979 | Japan. |
| 66182 | 4/1983 | Japan. |
| 211343 | 12/1983 | Japan. |

*Primary Examiner*—A. A. Mathews
*Attorney, Agent, or Firm*—Francis H. Boos, Jr.

[57] ABSTRACT

A radial bar code providing DX film information is disposed on a disc mounted at an axial end of a film cassette, the disc being rotatable with rotation of the film spool during film extraction and rewind. Film exposure status visual indicators are disposed on the disc. A stationary optical reader in the camera in association with a logic and control circuit can thus read the DX information from the rotating disc during film extraction for suitable control of exposure conditions in the camera. During film rewind the angular positioning of the disc can be measured from the bar code to cause the disc to be stopped at the end of rewind with appropriate ones of the status indicators aligned to provide a visual indication to the camera user of the amount of film exposed in the cassette. A spool lock mechanism is provided for locking the film spool and the exposure indicators in place thereby preventing accidental rotation of the spool and consequent misindication of the exposure status when the cassette is outside the camera.

7 Claims, 5 Drawing Sheets

PHOTOGRAPHIC FILM CASSETTE

CROSS REFERENCE TO RELATED APPLICATION

Reference is made to commonly assigned copending Pat. applications Ser. No. 560,921 entitled "Photographic Film Cassette and Camera Apparatus and Method" filed Jul. 31, 1990, in the names of David C. Smart and J. David Cocca; and Pat. Ser. No. 560,922 entitled "Film Cassette with Locking Means for Exposure Status Indication" filed Jul. 31, 1990, in the names of D. M. Pagano, S. H. Miller and T. D. Jensen.

FIELD OF INVENTION

This invention relates to the field of film photography and more specifically to film cassettes bearing optically readable bar code indicia providing information relating to the film and which is also usable to set exposure status visual indicators on the cassette.

BACKGROUND OF INVENTION

It is well known to provide certain limited information regarding film contained in a cassette by means of a DX code imprinted on the exterior of the cassette. The code is typically embodied in conductive and non-conductive segments on the cylindrical body of the cassette which are sensed by electrical contacts in the camera. It is also known to provide DX information about the film in the form of an optical bar code imprinted on the cylindrical body of the cassette, the optical bar code having the advantage that more information about the film can be provided than is found in the conductive/non-conductive DX code segments. A problem with the bar code fixed on the cylindrical body of the cassette however, is that it requires the provision of a moving optical reader to be able to scan the length of the bar code which is costly and difficult to provide in a compact camera.

In U.S. Pat. No. 4,500,183, film related information is encoded on a rotatable magnetic disk axially mounted on the end of the film cassette and a drive mechanism is provided to rotate the disk so that the information can be read and recorded thereon by a stationary magnetic read/write head mounted in the camera. Although useful for its purpose, it requires costly disk drive and magnetic read/write components for its operation and reliability in reading of the magnetically recorded information can be adversely affected by variations in spacing between the read/record head and the magnetic surface as well as by the presence of stray fields emanating from drive motors in the camera.

In customary operation of a camera, when all image frames in a film strip are fully exposed, the film is rewound into the cassette to be removed and sent to a photofinisher for processing. At times, however, it is desirable to remove a cassette with the film unused or in a partially exposed condition. A common reason for this is to allow the camera user to change film types to better suit a particular photographic opportunity. In such a case, it is desirable to provide an indication to the user of the exposure status of the film as being unused, partially exposed or fully exposed so that double exposures are prevented if the cassette is subsequently reinserted into the camera.

In the above mentioned U.S. Pat. No. 4,500,183, provision is made for recording film use condition on the magnetic disk when film is rewound so that the camera can read the disk when a cartridge is inserted to give an indication to the user of the film use condition or to move the film to the first available unexposed frame. However, the disadvantage of this arrangement is that the cassette does not have a visual indication of the exposure status of the film and the cassette must be fully loaded and the camera operated in order to provide any indication of film use condition to the camera user. In preference to this arrangement, it is desirable to provide a visible indication on the cassette itself of the use condition of the film, particularly if the camera user has several cassettes to select from. This can be done by setting a rotatable indicator at one of several predetermined angular positions that visually indicates the condition of the film as being, for example, fully exposed, partially exposed or unexposed. For this purpose, however, some means must be provided to sense and keep track of the angular positioning of the indicator to assure proper positioning of the indicator at the conclusion of film rewind.

In the above mentioned cross referenced Pat. application Ser. No. 560,921, a film cassette and related camera apparatus is disclosed which utilizes measurement of a rotatable radial bar code on a disc at the end of the cassette as a basis for determining angular positioning of the disc and related positioning of film exposure indicators on the cassette. In the disclosed apparatus, however, only three indicator positions are given corresponding to unexposed, partially exposed and fully exposed conditions of the film in the cassette. It is desirable to provide a more precise indication of the partially exposed condition to give some measure of the amount of unexposed film remaining in the cassette. Moreover, no provision is made in the cassette for holding the exposure indicators in place after they have been positioned.

It is, therefore, an object of the invention to provide a film cassette with optically readable bar code information which can be used to set exposure status visual indicators on the cassette upon conclusion of film rewind into the cassette in such a way as to indicate the amount of unused film when in the partially exposed condition.

It is a further object of the invention to provide a film cassette having an optically readable rotatable bar code thereon for setting exposure status indicators with means for holding the indicators in position once the indicators have been set and the cassette removed from the camera.

SUMMARY OF INVENTION

Thus in accordance with the invention, there is provided a photographic film cassette for use in a camera, the cassette comprising a cylindrical housing, a rotatable film spool within the housing and a radial bar code formed on a disc rotatable in association with rotation of the film spool at least during rewind of film into the cassette. The bar code represents information about the film in the cassette and is adapted also to serve in establishing angular positioning of the bar code disc at the conclusion of film rewind. Indicia means is provided in the cassette, the indica means being rotatable in association with rotation of the bar code disc for indication, by the angular positioning of the indicia means at the conclusion of film rewind, the approximate amount of unexposed image frames available on the film in the cassette.

In accordance with another feature of the invention, the cassette is further provided with a locking means for locking at least the indicia means in place whenever the cassette is removed from the camera, thus assuring that the film exposure indication will not be accidentally moved and give an incorrect indication of film exposure condition. In one preferred embodiment of the invention, the indicia means is comprised of a graphic or alphanumeric usage indicator disposed on a rotating disc attached to and rotatable with the film spool and the locking means operates to lock both the film and the indicia disc.

DETAILED DESCRIPTION

Figure 1:
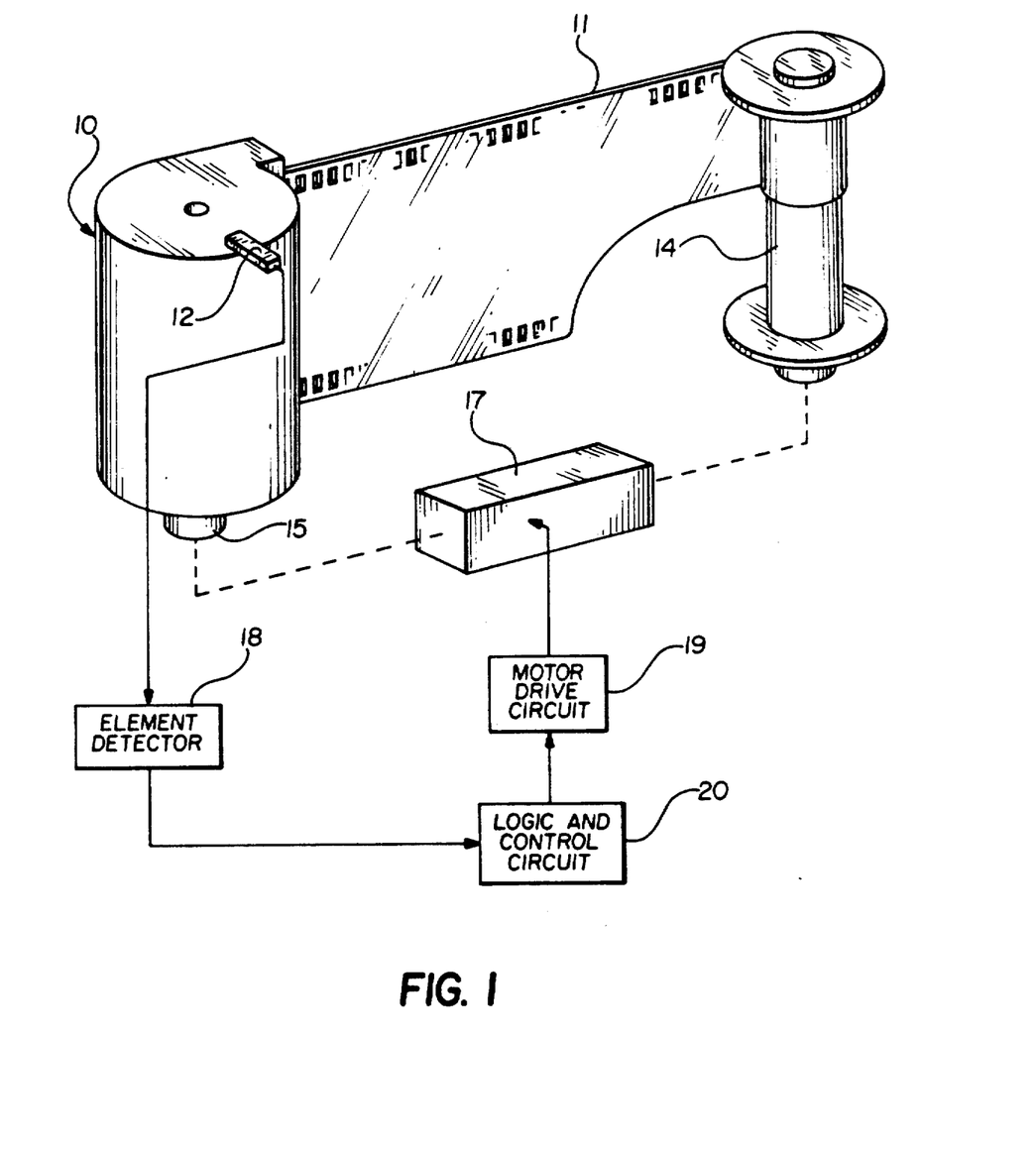
FIG. 1 is a partly perspective and partly schematic illustration of elements of a photographic camera and film cassette constructed in accordance with the invention.

Referring now to FIG. 1, the basic elements of a photographic camera useful in understanding the principles of the present invention include takeup spool 14, film drive motor 17 and associated drive motor circuit 19 and logic and control circuit 20. A film cassette 10 is removably positioned in a cassette-receiving portion of the camera (the camera body not being shown) such that film 11 can be drawn out of the cassette over a film exposure gate (not shown) and onto takeup spool 14.

Cassette 10 is provided with a rotatable radial bar code 21 (FIG. 2) circumferentially disposed on the exterior planar surface of a rotatable disc, e.g. an auxiliary spool flange 24 adjacent the outer perimeter thereof. A stationary optical reader 12 is included in the camera positioned so as to be over the circumferential path of bar code 21 as flange 24 rotates. The analog output of reader 12 is converted to a digital signal by a bar code element detector circuit 18 and applied to an input of logic control circuit 20. The bar code 21 may include information about the film such as film type, film ID, ISO information, number of image frames etc. which can read by reader 12 and input into logic and control circuit 20 to control camera operation in a well known manner. Since flange 24 is rotatable to convey bar code 21 under reader 12, reader 12 may be fixed in place within the camera thus simplifying the mechanism for optical reading of the bar code.

Figure 2:
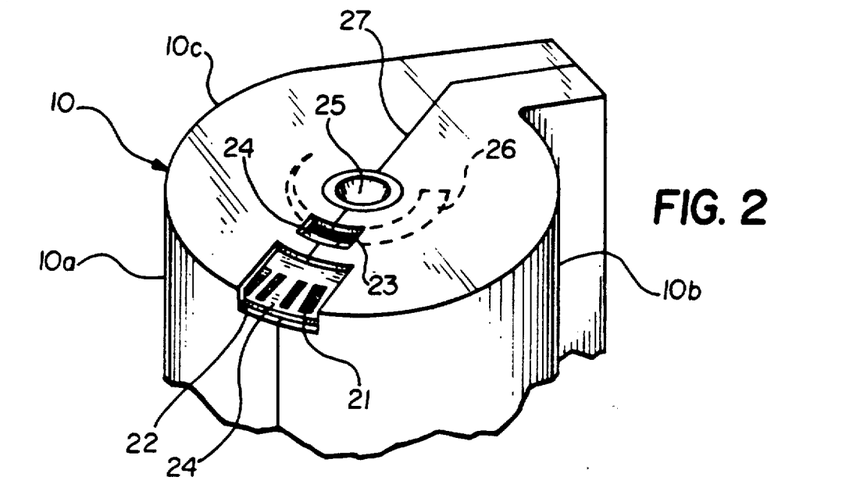
FIG. 2 is a partial perspective view of one end of a film cassette illustrating a bar code device and visual exposure indicator according to the present invention.
Figure 3:
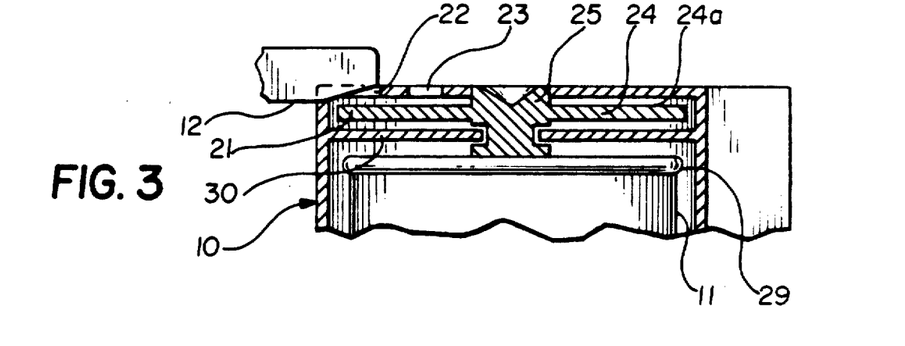
FIG. 3 is a side sectional view of the film cassette of FIG. 2.

Referring to FIGS. 2 and 3, the illustrated photographic film cassette includes a light tight generally cylindrical housing comprised of half sections 10a and 10b joined along junction line 27. Film 11 is wound on a central film spool (not shown) and is captured between spool flanges one of which is shown at 29. Internal end wall 30 extends into a groove in spool end 25 to provide a light tight compartment for film 11. Wall 30 and end cover 10c define a compartment which houses an auxiliary spool flange 24 serving as a rotatable bar coded disc on which radial bar code 21 is disposed. Bar code 21 may be imprinted directly on the surface of flange 24 or, more preferably, may be imprinted separately on a circular label adhered to the flange surface. A bar code reader window 22 is formed at or adjacent to the outer edge of cover 10c to allow access of reader 12 to the bar code when the cassette is inserted into the camera. As is more fully explained in aforementioned Pat. application Ser. No. 560,921, the disclosure of which is incorporated herein in its entirety, reading the bar code can be used to establish the angular position of flange 24 relative to a reference position on the flange. The reference position may, for example, be the point of transition between the start code segment and the data code segment of the bar code. In accordance with a feature of the invention, by using the bar code to determine angular position of flange 24 at the end of film rewind in conjunction with a frame exposure counter operation performed in logic and control circuit 20, the flange can then be stopped at a given position which will indicate the approximate amount of unexposed image frames on the film in the cassette. For this purpose, cover 10c is provided with a window 23 through which exposure indicator indicia means can be viewed. In the embodiment of FIG. 2, the indicia means takes the form of an arcuate ramp graphic 26 disposed on the surface of flange 24. When viewed through window 23 and depending on the angular position at which flange 24 is stopped, the ramp 26 indicates the usage condition of the film in the cassette by the degree to which the ramp fills up or does not fill up the window. In this fashion, the ramp serves as something of a gauge to indicate the amount of film that has been exposed and the remaining amount of film available for additional picture taking.

Figure 4:
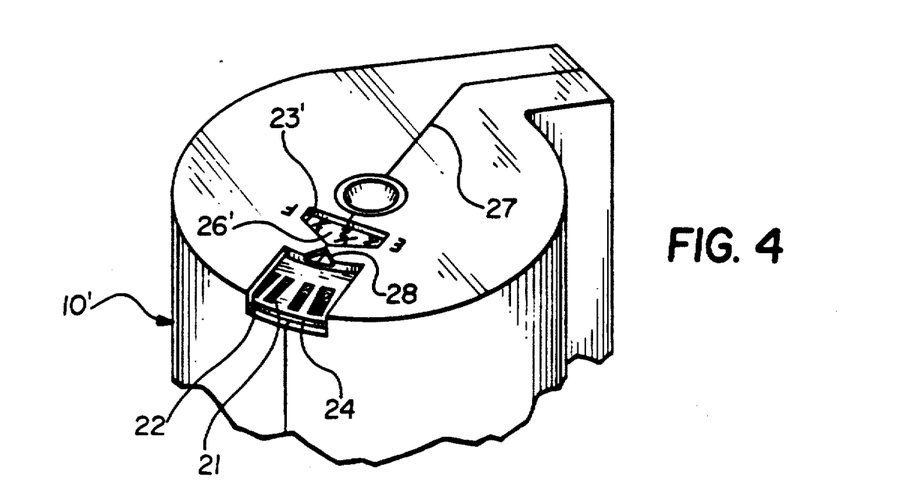
FIG. 4 is a partial perspective view of one end of a film illustrating an alternate embodiment of the invention.

In FIG. 4, cassette 10' an alternative embodiment of the indicia means is illustrated by alphanumeric indicia 26' which are used in place of the arcuate ramp graphic of FIG. 2. The illustrated indicia "E—¼—½—¾—F", when viewed through window 23', resembles the familiar markings of a gas gauge and readily indicates to the camera user the approximate amount of image frames remaining for future picture taking. It will be appreciated that other indicia may be employed to indicate the approximate degree to which additional image frames are available in the cassette, the indicia shown merely being illustrative.

Figure 5:
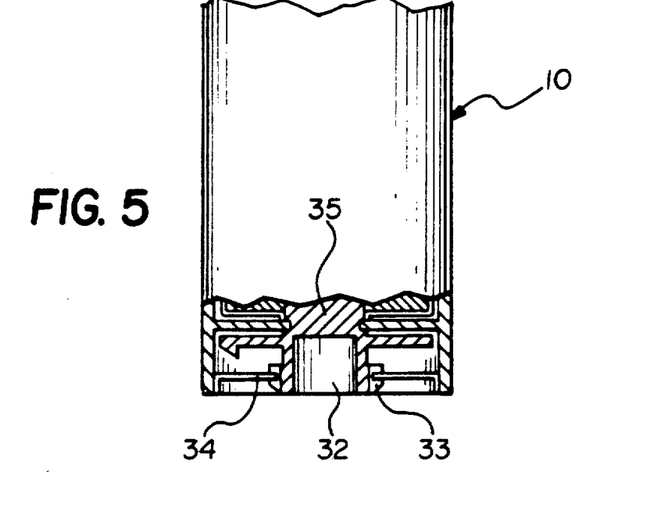
FIG. 5 is a side view, partly in section, of the drive end of a film cassette of the present invention.
Figure 6:
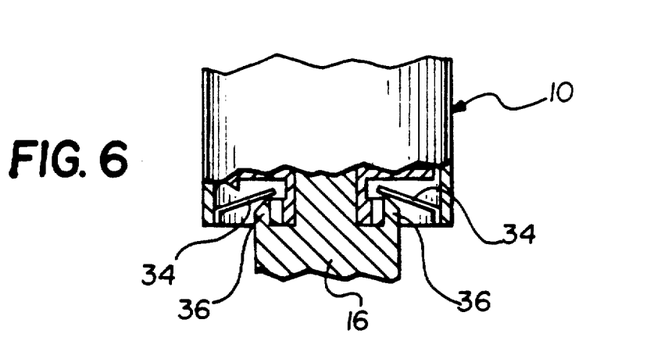
FIG. 6 is the same view of the cassette of FIG. 5 illustrating the camera drive in place in the cassette.
Figure 7:
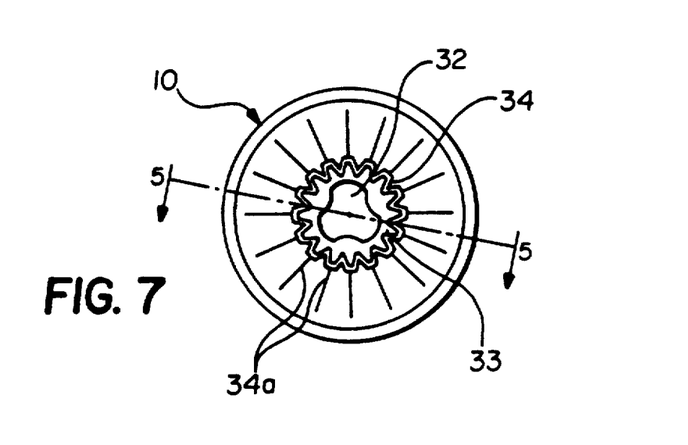
FIG. 7 is an end view of the cassette of FIG. 5.

When a cassette is removed from the camera, it is possible for the film spool to be accidentally rotated. This, of course, would upset the setting of the exposure indicators. To obviate this problem, and as shown in FIGS. 5-7, the drive end of cassette 10 includes toothed gear wheel 33 and flexible locking fingers 34 which define locking means for locking in place the film spool 35 and exposure indicator flange 24 whenever the cassette is outside of the camera. Flexible fingers 34 separated by slits 34a are normally biased into to engage the teeth of gear wheel 33 thereby providing the desired locking action. When the cassette is inserted into the camera, a mating drive member 16 in the camera engages a tri-lobe shaped drive hole 32 in the film spool shaft. At the same time, a circumferential projection 36 on the drive member 16 engages the flexible fingers 34 and pushes the fingers out of engagement with the locking gear teeth thereby freeing up the film spool and bar code flange 24 for rotation while in the camera.

As explained in aforementioned Pat. application Ser. No. 560,921, bar code 21 on disc 12 (FIG. 2) preferably has a predetermined format of alternating bars and spaces in which the width or angular relationship of the bars and spaces in successive binary positions of the circumferential code path corresponds to an known multiple of a predetermined angular segment of the disc. For example, in a simple bar code comprised of alternating bar and space elements wherein narrow elements (bars or spaces) represent binary 0's and wide elements (bars or spaces) represent binary 1's, each narrow element would have a selected angular width, such as 5°, and each wide element would be an known multiple of the narrow element, such as 3× or 15°. Additionally, the bar code preferably includes a singular code pattern serving as a start code, preferably appearing only once in the 360° rotation of the disc, which would then also serve as a reference point from which angular position of the disc can be determined relative to the detected bar code segments as they pass under the reader 12.

As thus described, the rotating radial bar code 21 has a dual function of serving, during extraction of the film from the cassette onto the take-up spool, to provide the aforementioned film-related information represented by the binary data in the bar code and, during either film extraction or rewind, to provide a convenient pattern for measuring and determining the angular positioning of the flange 24. The latter function is useful for monitoring film transport speed in the camera either during film extraction or rewind and, during rewind in particular, it is useful for providing the above-described visual indication on the cassette of the usage or exposure status of the film in the cassette at the conclusion of rewind.

Figure 8:
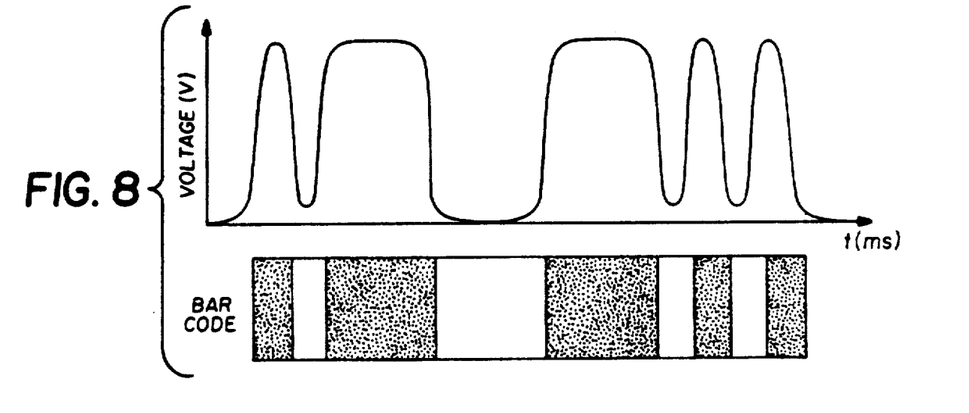
FIG. 8 is a diagram of a portion of a bar code and a signal therefrom which is useful in explaining the invention.

In operation, when a cassette 10 is inserted into the camera, circumferential projection 36 moves locking fingers 24 out of engagement with the teeth of gear wheel 33 thus freeing the cassette spool and spool flange 24 for rotation. When drive motor 17 is energized to extract film from cassette 10, either by driving the cassette spool to thrust the film out of the cassette or by driving take-up spool 14 to pull the film from the cassette, flange 24 rotates in concert with the rotation of the film spool. As flange 24 rotates, a bar code output signal is fed from optical reader 12 through a bar code element signal detector circuit 18 to an input of logic and control circuit 20. A representative portion of the bar code and the corresponding signal timing diagram appearing at the output of optical reader 12 are shown in FIG. 8. During film extraction, the film information represented by the bar code can be used to program the camera. During film rewind and particularly at the end of film rewind the bar code can be used to determine the angular position at which flange 24 is to be stopped so that the visual indicia 26 properly indicates the amount of film usage.

In a preferred embodiment of the invention, positioning of the visual indicator 26 on the cassette is accomplished by using a start code bar width measurement as a means for generating an internal clocking mechanism in the logic circuit and control circuit 18 which is then used by the controller to position and stop the flange 24 at the desired angular position and accordingly to position the film exposure indicia means as desired. When it is desired to initiate positioning of the flange 24 at the conclusion of rewind, drive motor 17 is enabled and the logic and control circuit 20 begins reading the bar code, searching for the start code segment. When the start code is recognized, the element widths are measured in known manner and used to initiate a sync or code clock. Preferably using a narrow element width in the start code, corresponding to a narrow element in the data code, the sync clock is established such that the sync "ticks" are integrally related to the code elements. It is desirable that the width of the narrow and wide elements of the data code be integrally related to the period of the sync clock "ticks" as will become apparent from the following description.

Figure 9:
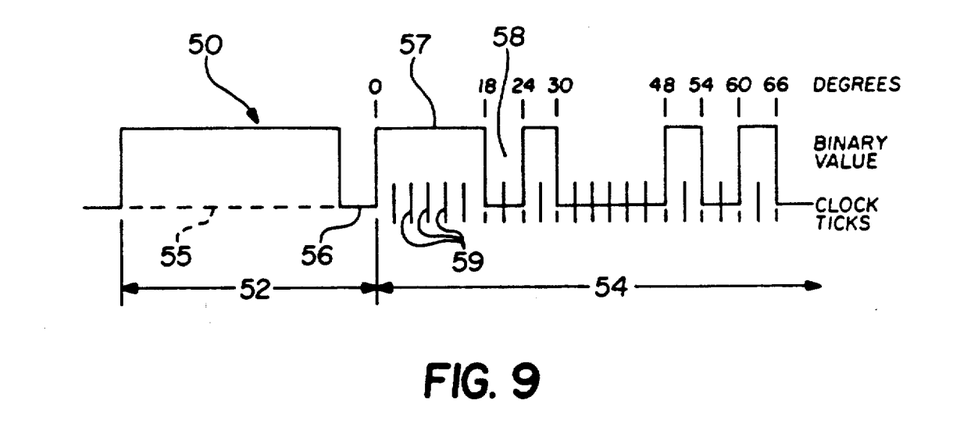
FIG. 9 is a binary signal diagram useful in explaining the invention.

Referring to FIG. 9, a representative bar code signal 50 as sensed by the camera optical reader is shown comprised of a start code segment 52 followed by the data code elements 54. The illustrated start code segment 52 is comprised of a wide element or quiet zone 55 followed by a narrow element 56 which is preferably of the same width as the narrow elements 58 of the ensuing data code. As previously noted, the pulse width measurements correspond to the rotational angle on the bar code flange 24. The width measurement of narrow element 56 measurement is used to establish a sync clock period in the logic and control circuit 18 in the camera. Preferably the width of narrow element 56 is divided by some multiple greater than one to establish a finer positional resolution than represented by the narrow elements 56 and 58 of the start code and of the data code elements. Once the sync period is established, the logic and control circuit can calculate the number of sync "ticks" 59 that will provide the required angular displacement positioning of the flange that will achieve the desired alignment of the visual indicators on the cassette.

Figure 10:
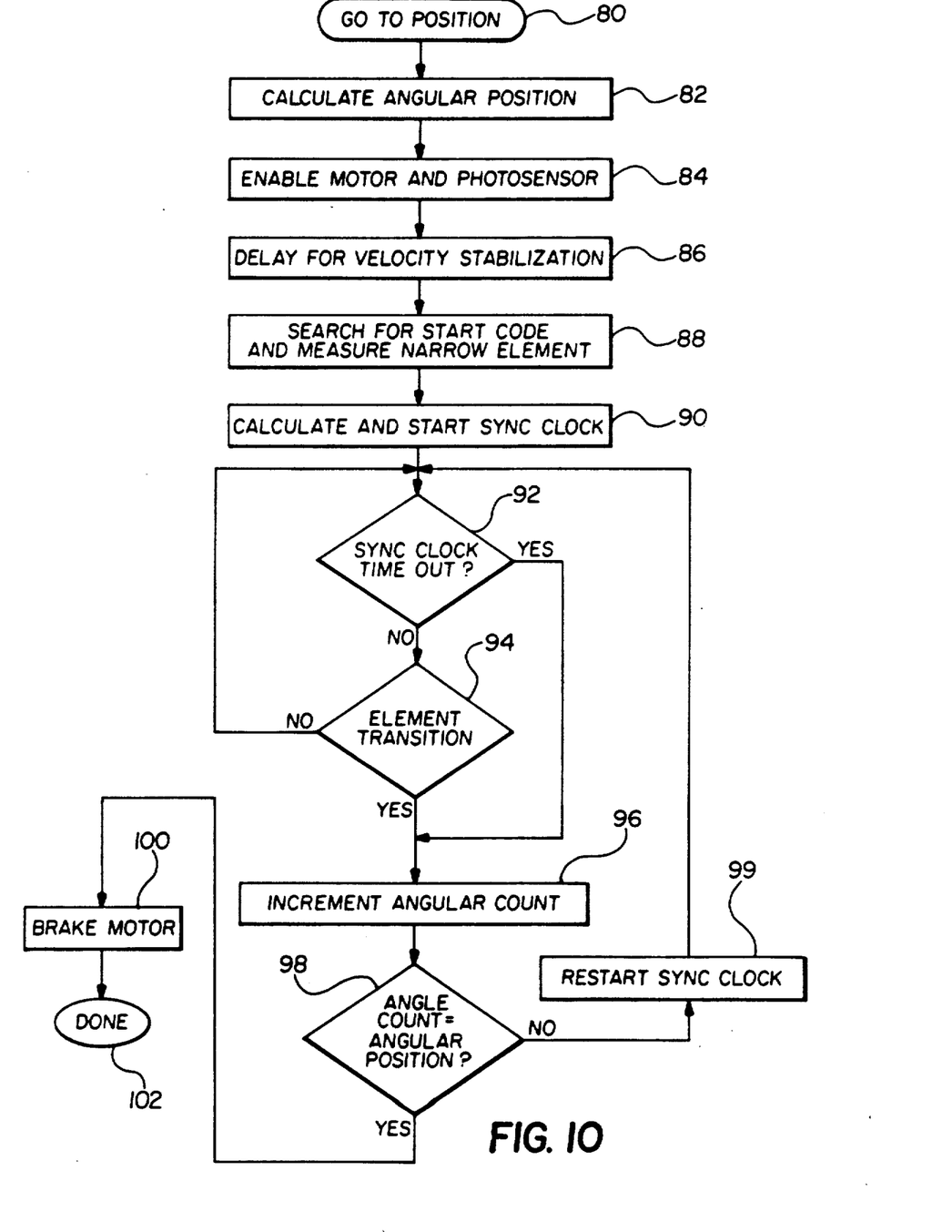
FIG. 10 is a logic flow chart for a program which may be used in a camera central processor unit in carrying out the present invention.

The manner in which the camera logic and control circuit can be programmed to achieve this result can be described with reference to the program flow chart of FIG. 10. Upon entering the positioning subprogram at 80, instruction 82 obtains from memory in logic and control circuit 20 information regarding the number of frames exposed and calculates the angular position at which flange 24 will align the visual indicators as desired. Instruction 84 then enables the drive motor 17, if not already enabled, and the optical reader 12. After this, instruction 86 is preferably included to insert a short delay to allow the film transport speed to get up and stabilize at the normal rate where the drive motor was not already in operation. Once the transport speed is stabilized, instruction 88 causes the start code to be recognized as it passes under the reader and the angular width of the narrow element in the start code to be measured. Instruction 90 then calculates the angular sync period, for example by dividing the narrow element width by a factor of two and starts the sync clock running at the calculated rate. Tests 92 and 94 begin cycling until either a sync "tick" 59 or a bar code data element transition is sensed at which time instruction 96 causes a cumulative angular count counter in logic circuit 18 to be incremented by the amount of the angular count determined by instruction 90. Following this,

TEMPORARY NOTICE of BEST AVAILABLE IMAGE

U. S. PATENT AND TRADEMARK OFFICE

THE SCANNED IMAGES OF PATENT NUMBER 5030978 FOR THE ISSUE DATE OF 7/9/1991, ARE NOT THE COMPLETE ORIGINAL DOCUMENT, BUT CONTAIN A COPY OF THE BEST AVAILABLE TEXT AND IMAGE DATA FROM VARIOUS SOURCES.

WHEN THE MISSING INFORMATION BECOMES AVAILABLE, THE DOCUMENT WILL BE RESCANNED AND REPLACED.

ANY QUESTIONS SHOULD BE DIRECTED TO THE DATA MAINTENANCE BRANCH BY TELEPHONE AT (703) 306-3116.

Col 7/8 To end
(Co Corrects)

TEMPORARY NOTICE of BEST AVAILABLE IMAGE

UNITED STATES PATENT AND TRADEMARK OFFICE
CERTIFICATE OF CORRECTION

PATENT NO. : 5,030,978　　　　　　　　　　　　Page 1 of 2
DATED : Jul. 9, 1991
INVENTOR(S) : Jeffrey R. Stoneham, et al It is certified that error appears in the above-indentified patent and that said Letters Patent is hereby corrected as shown below:

Columns 7 and 8 should be added as per attached sheets.

Signed and Sealed this

Twenty-second Day of March, 1994

Attest:

BRUCE LEHMAN

Attesting Officer　　　　Commissioner of Patents and Trademarks test 98 determines whether the desired aggregate count has been reached and, if not, the sync clock is restarted. In this way, the sync clock is synchronized to the bar code on a continuous measurement basis and consequently any slight variations in flange rotational rate are continuously accommodated. Once the desired angular count is reached, instruction 100 brakes the drive motor 17 with the visual indicators now properly aligned and the subprogram is exited at 102. When the cassette 10 is removed from the camera, spring fingers 24 engage the teeth of gear wheel 33 thereby locking the film spool and spool flange 24 from accidental rotation.

The invention has been described in detail with particular reference to a presently preferred embodiment, but it will be understood that variations and modifications can be effected within the spirit and scope of the invention. For example, while the radial bar code 21 is generally illustrated as lying on the planar surface of the flange, it may alternatively be imprinted on the circumferential edge of the disk to be viewed through an aperture in the side of cassette housing 10 by an optical reader disposed radially outward from the axis of the film spool.

What is claimed is:

1. A photographic film cassette for use in a camera comprising:
   a cylindrical housing;
   a rotatable film spool within the housing;
   a radial bar code formed on a disc rotatable in association with rotation of the film spool at least during rewind of film into the cassette, said bar code adapted to serve as an indicator of angular positioning of said disc at the conclusion of film rewind;
   and indicia means rotatable in association with rotation of the bar code disc for indicating, by the angular positioning of the indicia means at the conclusion of film rewind, the approximate amount of unexposed image frames available on the film in the cassette.

2. The film cassette of claim 1 in which the indicia means is disposed on a rotating disc at one end of the cassette and the cassette includes a cover disposed over the indicia means, the cover having a window aligned with the path of the rotating indicia so that the amount of unexposed image frames is indicated by the indicia viewed through the window.

3. The film cassette of claim 2 in which the indicia comprises a continuous, gradually expanding arcuate band and the amount of unexposed image frames on the film is indicated by the degree to which the arcuate band fills up or does not fill up the window.

4. The film cassette of claim 2 in which the indicia means comprises alphanumeric gauge markings viewed through the window.

5. The film cassette of claim 1 in which the cassette further includes means for locking at least the indicia means in place whenever the cassette is removed from the camera.

6. The film cassette of claim 1 in which the indicia means is disposed on a disc attached to and rotatable with the film spool and in which the cassette further includes means for locking both the film spool and indicia disc in place and preventing rotation thereof whenever the cassette is removed from the camera.

7. The film cassette of claim 6 in which the locking means comprises a toothed gear wheel attached to the film spool and flexible locking fingers adapted to engage the gear wheel teeth when the cassette is removed from the camera thereby to prevent rotation of the film spool and indicia disc and to be disengaged from the gear wheel teeth by a mating camera member when the cassette is inserted into the camera thereby to allow free rotation of the film spool and indicia disc in the camera.

* * * * *